Figure 1:
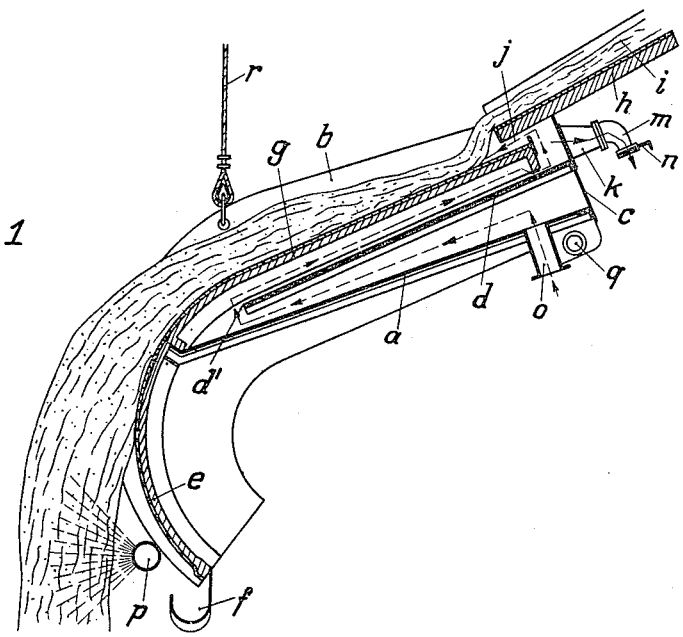

Carl H. Schol
Inventor:

Patented June 16, 1936

2,044,450

UNITED STATES PATENT OFFICE 2,044,450

APPARATUS FOR BLOWING UP LIQUID SLAG OR MELT INTO A HIGHLY POROUS MASS OF THE CHARACTER OF PUMICE

Carl H. Schol, Allendorf, near Dillenburg, Germany

Application February 7, 1935, Serial No. 5,384

8 Claims. (Cl. 49—77.5)

My invention relates to improvements in apparatus for blowing liquid slag or melt into a highly porous mass of the character of pumice, and more particularly in apparatus in which the slag or melt is passed through a gutter or chute which is cooled from its under side, and which has a supply of liquid adapted to blow the slag or melt. Apparatuses of this type are used for blowing slag or melt from blast furnaces, and other furnaces and melting processes.

In the operation of such apparatuses it is found that the liquid slag or melt is different in character, according to its composition and to its origin, and that some slag or melt is readily blown into a porous mass, while other slag or melt is blown only with difficulty. Therefore the amount of water to be supplied to the slag for obtaining best results is different according to the character of the slag, and more particularly the slag or melt which is blown with difficulty requires a comparatively large amount of water. Further, the slag or melt is not uniformly delivered from the melting furnace, and therefore the amount of water must be varied according to the volume of the slag delivered from the furnace.

One of the objects of the present invention is to provide an apparatus of this type in which the gutter is effectively cooled from its under side, so that there is no danger of the slag being fused to the bottom of the gutter, and in which means are provided for regulating the amount of water supplied to the slag for blowing the same. With this object in view my invention consists in supplying a comparatively large amount of cooling water to the under side of the gutter and providing means for supplying a variable amount of the said cooling water to the top side of the gutter or melt, the excess of water being removed without acting on the slag.

Another object of the improvements is to provide an apparatus in which fusing of the slag throughout the length of the gutter is effectively prevented, and with this object in view my invention consists in locating the passage for the cooling water so that the gutter is cooled nearly down to the part where the slag has been blown into a porous mass and is delivered from the gutter across the downwardly curved portion thereof.

In apparatus now in use the bottom of the gutter is subject to mechanical destruction by the slag falling thereon, and therefore the apparatus must be removed from the plant after a period of use to have the gutter repaired or replaced by a new one. This causes much trouble because for a certain length of time the slag or melt cannot be transformed into a porous mass and is wasted. Therefore, another object of the improvements is to provide an apparatus which may be readily repaired without being removed from the plant and within a very short period of time, and with this object in view my invention consists in constructing the bottom of the gutter, and more particularly the portion thereof which is exposed to maximum wear, of one or more removable plates or bars, which in case of wear may be readily replaced. By thus constructing the gutter the removable bottom thereof may be made of a material which is particularly resistant to wear.

Figure 2:
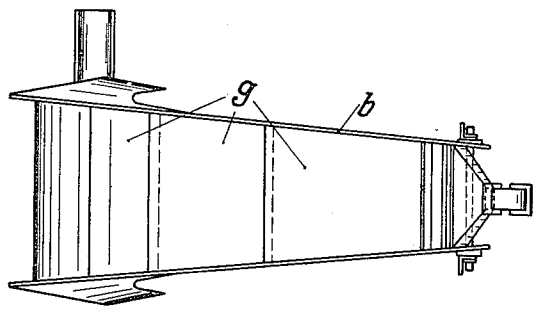
Figure 3:
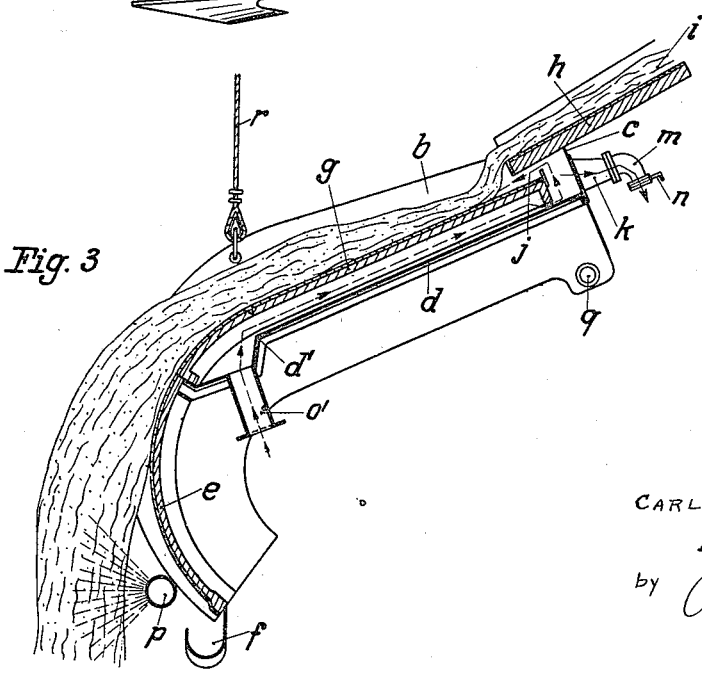

For the purpose of explaining the invention two examples embodying the same have been illustrated in the accompanying drawing in which Fig. 1 is a sectional elevation showing the gutter, Fig. 2 is a top plan view of Fig. 1, and Fig. 3 is a sectional elevation showing a modification.

In the construction shown in Figs. 1 and 2 the gutter comprises a sloping body or main part having a bottom $a$, side walls $b$, an end wall $c$ and a partition $d$ extending from the end wall $c$ to a point $d'$ remote from the lower end of the bottom $a$. At its lower end the body comprises a downwardly curved portion $e$ which carries a transverse gutter $f$ for removing any excess of water.

Above the partition $d$ one or more plates $g$ are mounted on the side walls $b$, which plates are curved downwardly at their lower ends so as to merge into the curved portion $e$, and which are constructed so that they may be readily removed from the body $a, b$ and replaced by other plates or bars. The said plates or bars consist of hematite steel, a highly refractory hematite alloy, a bronze alloy or of refractory ceramic material such as chamotte.

Above the gutter and at the intake end thereof there is a chute $h$ by means of which the liquid slag or melt $i$ is supplied from the furnace to the gutter.

By the bottom $a$, the partition $d$ and the plate or plates $g$ a cooling passage is provided which comprises two branches communicating with each other at their lower ends, and the upper branch opens through a passage $j$ provided between the chute $h$ and the plate $g$ to the top part of the said plate and below the delivery end of the said chute. To the end plate $c$ and in position for communication with the upper branch an overflow $k$ is secured which is connected with an elbow $m$ adapted to be closed more or less by means of a gate valve $n$.

The lower branch provided between the bottom $a$ and the partition $d$ is provided near its upper end with a pipe $o$ for the supply of water.

Below the portion $e$ of the gutter there is a supply $p$ for cooling air.

The whole gutter is pivotally mounted on a transverse shaft $q$, and it is suspended from a rope $r$, so that its inclination may be varied according to the requirements of the operation.

The operation of the apparatus is as follows:

The liquid slag or melt is delivered from the chute $h$ on the plates $g$ of the gutter, and it flows downwardly thereon. A comparatively large amount of water is supplied to the pipe $o$ and flows through the two branches of the cooling passage, the said amount of water being at least equal to the amount of water which may be needed at any time for blowing the slag or melt, and the said amount may even be greater than this, if necessary for effectively cooling the plate or plates $g$. The gate $n$ is set in position so that a certain portion of the cooling water is discharged through conduit $m$ and only so much water flows through the passage $j$ and to the top part of the gutter as is needed for blowing the slag. Should the volume of slag or the character thereof change so that more water is needed for blowing the same, the delivery opening of the elbow $m$ is reduced by means of the gate $n$, and, vice versa, if less water is needed the said delivery opening is enlarged. Therefore under any conditions the plates $g$ are effectively cooled, and yet the blown slag or melt is delivered from the gutter in a comparatively dry state.

Any excess of water which is delivered from the gutter $a$, $b$ is collected within the transverse gutter $f$.

In the modification shown in Fig. 3 the bottom $a$ is omitted, and the cooling passage comprises a single branch, the pipe $o'$ being provided at the lower end of the said cooling passage. Otherwise the construction and operation of the apparatus are the same as has been described with reference to Figs. 1 and 2, and the same letters of reference have been used to indicate corresponding parts.

I claim:

1. An apparatus for blowing molten slag, comprising a gutter having a slag conveying surface, a slag receiving end and a slag discharge end, there being a chamber for the reception of cooling liquid below said gutter, means for supplying slag to said gutter, means for supplying liquid to said chamber and means for deflecting liquid from said chamber onto the conveying surface of the gutter.

2. An apparatus for blowing molten slag, comprising a gutter having a slag conveying surface, a slag receiving end and a slag discharge end, there being a chamber for the reception of cooling liquid below said gutter, means for supplying slag to said gutter, means for supplying liquid to said chamber and means in said chamber adjacent the receiving end of the gutter for deflecting liquid from said chamber onto the conveying surface of the gutter at its receiving end.

3. An apparatus for blowing molten slag, comprising the combination of the elements of claim 1 with means for regulating the quantity of liquid passing from said chamber to said gutter.

4. An apparatus for blowing molten slag, comprising the combination of the elements of claim 2 with means for regulating the quantity of liquid passing from said chamber to said gutter.

5. An apparatus for blowing molten slag, comprising a gutter having a slag conveying surface, a slag receiving end and a slag discharge end, there being a chamber for the reception of cooling liquid below said gutter, said chamber having one end thereof in communication with the receiving end of said gutter, means for supplying slag to said gutter, means for supplying liquid to said chamber, and means for deflecting liquid from said end of the chamber to the conveying surface of the gutter at the receiving end of the latter.

6. An apparatus for blowing molten slag, comprising the combination of the elements of claim 1 with means for withdrawing regulated quantities of liquid from said chamber, said last named means comprising a valved conduit.

7. An apparatus for blowing molten slag, comprising a gutter having a slag conveying surface, a slag receiving end and a downwardly curved discharge end, there being a chamber for the reception of cooling liquid below said gutter extending substantially from said receiving end to said downwardly curved discharge end, means for supplying slag to said gutter, means for supplying liquid to said chamber and means for deflecting liquid from said chamber onto the conveying surface of the gutter.

8. An apparatus for blowing molten slag, comprising a gutter having a slag conveying surface, a slag receiving end and a downwardly curved slag discharge end, said conveying surface comprising removable sections, there being a chamber for the reception of cooling liquid below said gutter extending substantially from said receiving end to said discharge end, means for supplying slag to said gutter, means for supplying liquid to said chamber and means for deflecting liquid from said chamber onto the conveying surface of the gutter at its receiving end.

CARL H. SCHOL.